United States Patent
Polewczyk et al.

(10) Patent No.: US 12,165,298 B2
(45) Date of Patent: Dec. 10, 2024

(54) MACHINE LEARNING ENABLED DOCUMENT DESKEWING

(71) Applicant: SAP SE, Walldorf (DE)

(72) Inventors: Marek Polewczyk, Berlin (DE); Marco Spinaci, Le Chesnay (IT)

(73) Assignee: SAP SE, Walldorf (DE)

(*) Notice: Subject to any disclaimer, the term of this patent is extended or adjusted under 35 U.S.C. 154(b) by 472 days.

(21) Appl. No.: 17/570,678

(22) Filed: Jan. 7, 2022

(65) Prior Publication Data
US 2023/0222632 A1  Jul. 13, 2023

(51) Int. Cl.
*G06T 5/80* (2024.01)
*G06V 10/774* (2022.01)
*G06V 30/16* (2022.01)
*G06V 30/414* (2022.01)

(52) U.S. Cl.
CPC ............ *G06T 5/80* (2024.01); *G06V 10/774* (2022.01); *G06V 30/1607* (2022.01); *G06V 30/414* (2022.01); *G06T 2207/10008* (2013.01); *G06T 2207/20081* (2013.01); *G06T 2207/30176* (2013.01)

(58) Field of Classification Search
CPC ........... G06T 2207/10008; G06T 2207/20081; G06T 2207/30176; G06T 3/20; G06T 5/80; G06T 2207/10004; G06T 3/60; G06T 3/608; G06V 10/774; G06V 30/1607; G06V 30/414; G06V 30/41; G06V 30/413; G06V 10/82; H04N 1/3877; H04N 1/3878

USPC ............................................. 382/225
See application file for complete search history.

(56) References Cited

U.S. PATENT DOCUMENTS

2021/0034856 A1* 2/2021 Torres .................. G06V 30/414
2023/0186668 A1* 6/2023 Dong .................... G06F 40/114
                                                                  382/176

OTHER PUBLICATIONS

Dobai, L., & Teletin, M. (2019). A document detection technique using convolutional neural networks for optical character recognition systems. In ESANN. (Year: 2019).*

* cited by examiner

*Primary Examiner* — Emily C Terrell
*Assistant Examiner* — Emmanuel Silva-Avina
(74) *Attorney, Agent, or Firm* — Mintz Levin Cohn Ferris Glovsky and Popeo, P.C.

(57) ABSTRACT

A method may include determining, based at least on an image of a document, a plurality of text bounding boxes enclosing lines of text present in the document. A machine learning model may be trained to determine, based at least on the coordinates defining the text bounding boxes, the coordinates of a document bounding box enclosing the text bounding boxes. The document bounding box may encapsulate the visual aberrations that are present in the image of the document. As such, one or more transformations may be determined based on the coordinates of the document bounding box. The image of the document may be deskewed by applying the transformations. One or more downstream tasks may be performed based on the deskewed image of the document. Related methods and articles of manufacture are also disclosed.

18 Claims, 11 Drawing Sheets

MACHINE LEARNING ENABLED DOCUMENT DESKEWING

FIELD

The present disclosure generally relates to machine learning and more specifically to machine learning enabled document deskewing.

BACKGROUND

Machine learning models may be trained to perform a variety of cognitive tasks including, for example, object identification, natural language processing, information retrieval, and speech recognition. For example, a machine learning model trained to perform natural language processing may classify text by at least assigning, to the text, one or more labels indicating a sentiment, a topic, and/or an intent associated with the text. Training the machine learning model to perform a cognitive task may include adjusting the machine learning model to minimize the errors present in the output of the machine learning model. For instance, training the machine learning model may include adjusting the weights applied by the machine learning model in order to minimize a quantity of incorrect labels assigned by the machine learning model.

SUMMARY

Methods, systems, and articles of manufacture, including computer program products, are provided for machine learning enabled document deskewing. In one aspect, there is provided a system. The system may include at least one data processor and at least one memory. The at least one memory may store instructions that result in operations when executed by the at least one data processor. The operations may include: determining, based at least on a first image of a first document, a plurality of text bounding boxes present in the first document; applying a machine learning model trained to determine, based at least on a first plurality of coordinates defining the plurality of text bounding box present in the first document, a second plurality of coordinates of a first document bounding box enclosing the one or more text bounding boxes present in the first document; determining, based at least on the second plurality of coordinates of the first document bounding box, one or more transformations; and deskewing the first image of the first document by at least applying, to the first image of the first document, the one or more transformations.

In some variations, one or more of the features disclosed herein including the following features can optionally be included in any feasible combination. The machine learning model is applied to a threshold quantity of text bounding boxes present in the first document.

In some variations, the threshold quantity of text bounding boxes may include a first text bounding box from a top of the first document, a second text bounding box from a bottom of the first document, and a third text bounding box between the first text bounding box and the second text bounding box.

In some variations, the operations may further include: in response to the first document including less than the threshold quantity of text bounding boxes, duplicating at least one of the plurality of text bounding boxes present in the first document to generate the threshold quantity of text bounding boxes.

In some variations, the operations may further include: in response to the first document including more than the threshold quantity of text bounding boxes, selecting some but not all of the plurality of text bounding boxes present in the first document to generate the threshold quantity of text bounding boxes.

In some variations, the operations may further include: generating, based at least on a second image of a second document without any visual aberrations, a training sample; and training, based at least on the training sample, the machine learning model.

In some variations, the training sample may be generated by at least identifying one or more text bounding boxes present in the second document, determining a second document bounding box enclosing the one or more text bounding boxes, distorting the second document bounding box, and determining one or more distorted text bounding boxes corresponding to the distorted second document bounding box.

In some variations, the training sample may be generated to include a third plurality of coordinates of the one or more distorted text bounding boxes and a ground truth label corresponding to a fourth plurality of coordinates of the distorted second document bounding box.

In some variations, the operations may further include: performing, based at least on the deskewed first image of the first document, one or more downstream tasks on the first document.

In some variations, the one or more downstream tasks may include optical character recognition (OCR), document classification, and/or information extraction.

In some variations, the plurality of text bounding boxes may be identified by performing optical character recognition (OCR) on the first document to identify a plurality of lines of text present in the first document. Each text bounding box of the plurality of text bounding boxes may enclose a corresponding line of text of the plurality of lines of text.

In some variations, the first plurality of coordinates may include an x-coordinate and a y-coordinate for each corner of the plurality of text bounding boxes.

In some variations, the second plurality of coordinates may include an x-coordinate and a y-coordinate for each corner of the first document bounding box.

In some variations, the machine learning model may include one or more of a multilayer perceptron, a transformer, a recurrent neural network, a linear regression model, a support vector machine, a random forest, or a Gaussian process.

In some variations, the one or more transformations may be applied to correct at least one visual aberration present in the first image of the first document. The at least one visual aberration may include a rotation, a perspective distortion, and/or an optical distortion.

In another aspect, there is provided a method for machine learning enabled document deskewing. The method may include: determining, based at least on a first image of a first document, a plurality of text bounding boxes present in the first document; applying a machine learning model trained to determine, based at least on a first plurality of coordinates defining the plurality of text bounding box present in the first document, a second plurality of coordinates of a first document bounding box enclosing the one or more text bounding boxes present in the first document; determining, based at least on the second plurality of coordinates of the first document bounding box, one or more transformations; and deskewing the first image of the first document by at least applying, to the first image of the first document, the one or more transformations.

In some variations, one or more of the features disclosed herein including the following features can optionally be included in any feasible combination. The machine learning model may be applied to a threshold quantity of text bounding boxes present in the first document. The threshold quantity of text bounding boxes may include a first text bounding box from a top of the first document, a second text bounding box from a bottom of the first document, and a third text bounding box between the first text bounding box and the second text bounding box. In response to the first document including less than the threshold quantity of text bounding boxes, at least one of the plurality of text bounding boxes present in the first document may be duplicated to generate the threshold quantity of text bounding boxes. In response to the first document including more than the threshold quantity of text bounding boxes, some but not all of the plurality of text bounding boxes present in the first document may be selected to generate the threshold quantity of text bounding boxes.

In some variations, the method may further include: generating, based at least on a second image of a second document without any visual aberrations, a training sample, the training sample being generated by at least identifying one or more text bounding boxes present in the second document, determining a second document bounding box enclosing the one or more text bounding boxes, distorting the second document bounding box, and determining one or more distorted text bounding boxes corresponding to the distorted second document bounding box, the training sample being generated to include a third plurality of coordinates of the one or more distorted text bounding boxes and a ground truth label corresponding to a fourth plurality of coordinates of the distorted second document bounding box; and training, based at least on the training sample, the machine learning model.

In some variations, the method may further include: performing, based at least on the deskewed first image of the first document, one or more downstream tasks on the first document, the one or more downstream tasks including optical character recognition (OCR), document classification, and/or information extraction.

In another aspect, there is provided a computer program product that includes a non-transitory computer readable storage medium. The non-transitory computer-readable storage medium may include program code that causes operations when executed by at least one data processor. The operations may include: determining, based at least on a first image of a first document, a plurality of text bounding boxes present in the first document; applying a machine learning model trained to determine, based at least on a first plurality of coordinates defining the plurality of text bounding box present in the first document, a second plurality of coordinates of a first document bounding box enclosing the one or more text bounding boxes present in the first document; determining, based at least on the second plurality of coordinates of the first document bounding box, one or more transformations; and deskewing the first image of the first document by at least applying, to the first image of the first document, the one or more transformations.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to machine learning enabled document deskewing, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
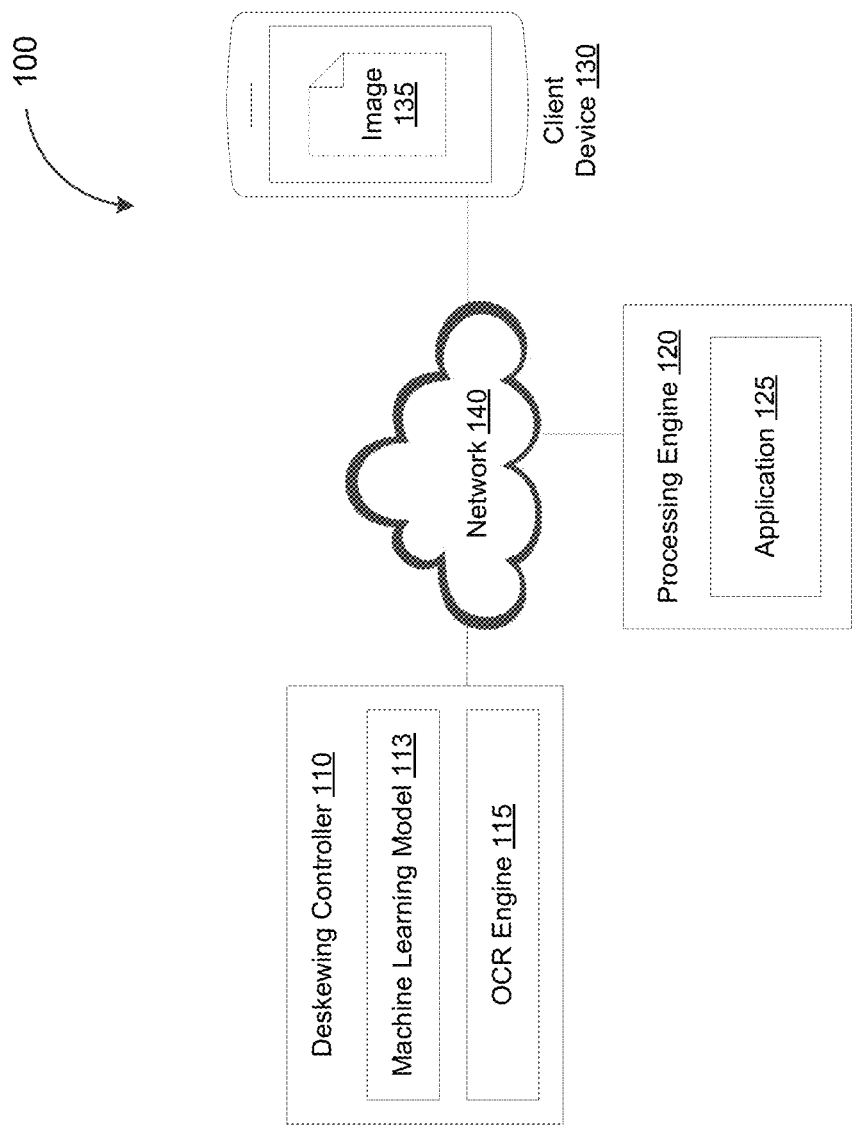
FIG. 1 depicts a network diagram illustrating a document analysis system, in accordance with some example embodiments.

When practical, like labels are used to refer to same or similar items in the drawings.

DETAILED DESCRIPTION

When capturing an image of an object using a camera, changing the perspective from which the image is captured (e.g., the angle of the camera) changes the manner in which the object is depicted in the resulting image. For certain computer vision tasks that operate on the contents of a document depicted in an image, a scan of the document or an overhead shot in which the image is captured while the camera is positioned directly above the document (e.g., at substantially a 90-degree above the document) tend to provide the ideal perspective. For example, text depicted in a top view image of the document that is captured from directly above the document may be well aligned, thus increasing the performance of downstream processing tasks such as optical character recognition (OCR), document classification, information extraction, and/or the like. The outcome of such downstream tasks may also be more accurate and precise at least because the machine learning models engaged to perform such tasks are often trained based on top view images of documents.

Contrastingly, the presence of one or more visual aberrations in the image of a document, such as rotations, perspective distortions, and/or optical distortions of the document, may render downstream processing tasks more difficult. For example, extracting information from a distorted image of a document containing a table may be difficult when the content occupying the rows and columns of the table cannot be localized by using horizontal and vertical lines to identify the rows and columns of the table. Conventional techniques to determine a perspective transform to remove the distortions present in the image of a document operate on a pixel-level and are therefore exceedingly resource intensive. Despite requiring dedicated hardware (such as graphics processing units (GPUs)) and imposing a high latency, neither of which are practicable for many ordinary applications, conventional deskewing techniques are also likely to fail in common scenarios where the borders of the document depicted in an image are not sufficiently visible (e.g., depicted with sufficiently high contrast against the background of the image).

In some example embodiments, a deskewing controller may apply a machine learning model to identify, based on one or more text bounding boxes present in a document, a document bounding box for the document. For example, a text bounding box may be defined by the coordinates (e.g., an x-coordinate and a y-coordinate) of the four corners of the text bounding box. As such, the machine learning model may be trained to determine, based at least on the coordinates of the individual text bounding boxes present in the document, the coordinates of the four corners of the document bounding box. The document bounding box, which encloses the text bounding boxes present in the document, may encapsulate the one or more visual aberrations that may be present in the image of the document including, for example, rotations, radial distortions, perspective distortions, and/or the like. Accordingly, the deskewing controller may determine, based at least on the document bounding box, one or more transformations to correct the one or more visual aberrations present in the image of the document. Moreover, the deskewing controller may apply, to the image of the document, the one or more transformations such that a downstream processing task may be performed based on the deskewed image of the document.

Unlike conventional pixel-level deskewing techniques that operate on an entire image, the machine learning model may operate on no more than a threshold quantity of text bounding boxes. For example, the machine learning model may determine the document bounding box of an image of a document based on an N-quantity of the text bounding boxes present in the document, each of which being defined by four pairs of coordinates (e.g., four pairs of xy-coordinates). As such, the deskewing controller may be able to determine the document bounding box and the corresponding transformations to deskew the image of the document with less computational resources and latency. For instance, by applying the trained machine learning model, the deskewing controller may be able to determine the coordinates of the document bounding box based on a 4N-quantity of values. In one example use case where N=20, the deskewing controller may be capable of determining the document bounding box and the corresponding transformations in approximately 0.015 seconds using a single core central processing unit (CPU).

FIG. 1 depicts a system diagram illustrating an example of a document analysis system 100, in accordance with some example embodiments. Referring to FIG. 1, the document analysis system 100 may include a deskewing controller 110, a processing engine 120, and a client device 130. The deskewing controller 110, the processing engine 120, and the client device 130 may be communicatively coupled via a network 140. It should be appreciated that the client device 130 may be a processor-based device including, for example, a smartphone, a tablet computer, a wearable apparatus, a virtual assistant, an Internet-of-Things (IoT) appliance, and/or the like. The network 140 may be a wired network and/or a wireless network including, for example, a wide area network (WAN), a local area network (LAN), a virtual local area network (VLAN), a public land mobile network (PLMN), the Internet, and/or the like.

Referring again to FIG. 1, the deskewing controller 110 may receive, from the client device 130, an image 135 of a document having one or more visual aberrations including, for example, rotation, radial distortion, perspective distortion, and/or the like. For example, the image 135 of the document may be captured by a camera that is not positioned directly above the document. The image 135 of the document received at the deskewing controller 110 may therefore exhibit the one or more visual aberrations that render one or more downstream tasks performed on the image 135 of the document more difficult. For instance, the processing engine 120 may include an application 125 that supports one or more tasks such as optical character recognition (OCR), document classification, information extraction, and/or the like. However, the presence of the one or more visual aberrations in the image 135 of the document may increase the computational complexity of these tasks while reducing the accuracy of the corresponding results.

In some example embodiments, the deskewing controller 110 may deskew the image 135 of the document by at least applying a machine learning model 113 trained to identify a document bounding box that encapsulates the one or more visual aberrations present in the image 135 of the document. For example, the deskewing engine 110 may include an optical character recognition (OCR) engine 115 configured to detect one or more text bounding boxes present within the image 135 of the document. Each text bounding box may enclose at least a portion of the content present in the image 135 of the document such as, for example, a line of text included in the image 135 of the document. Furthermore, each text bounding box may be associated with a set of values defining its dimension and orientation in a rectilinear space. For instance, a single text bounding box may be defined by the coordinates of its four corners or by the coordinates of its center point as well as its width, height, and angle of rotation. Accordingly, the machine learning model 113 may be applied to determine, based at least on the coordinates of the individual text bounding boxes present in the image 135 of the document, the coordinates of the four corners of the document bounding box. Moreover, the deskewing controller 110 may determine, based at least on the document bounding box, one or more transformations to correct the one or more visual aberrations present in the image 135 of the document.

Figure 2A:
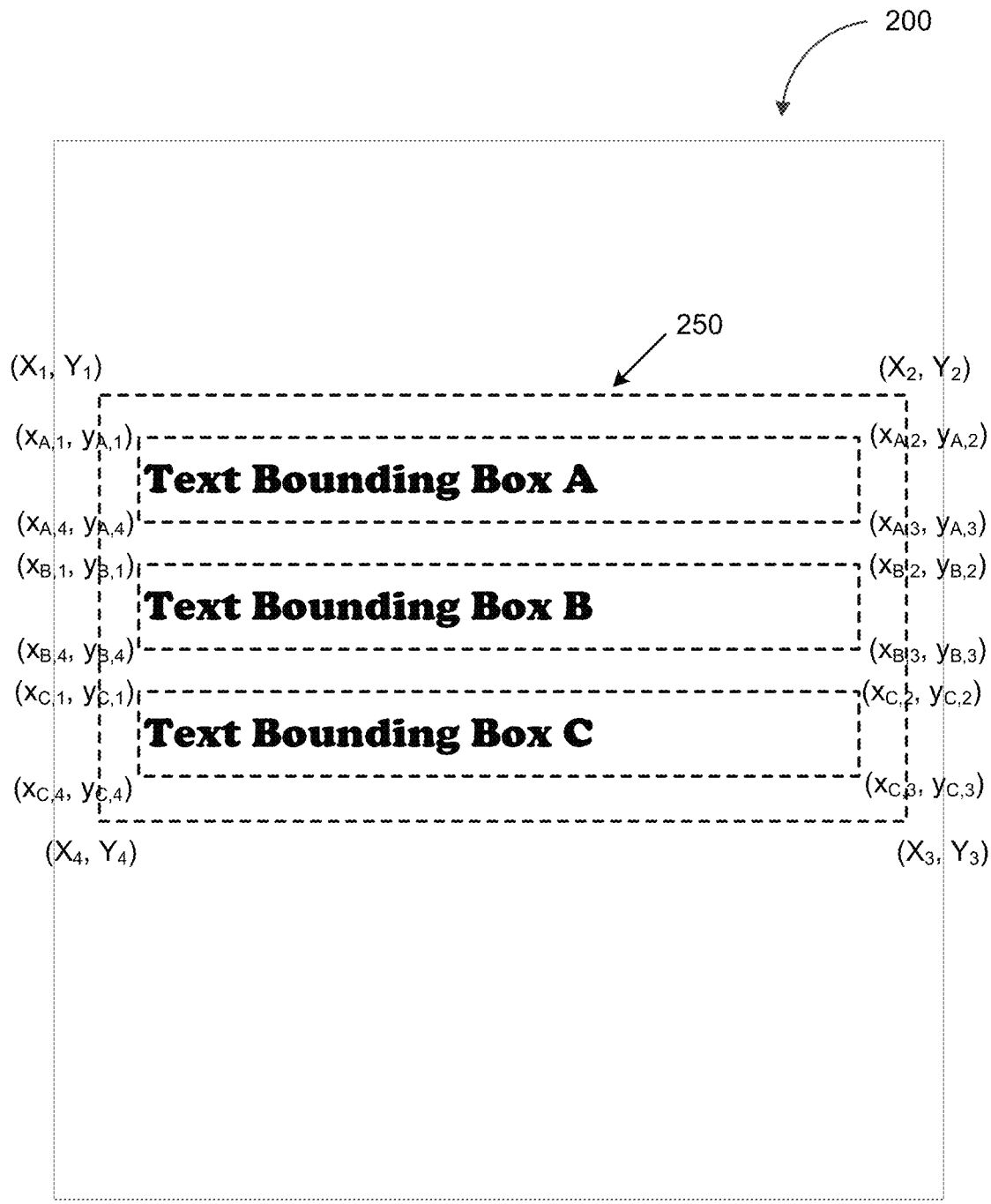
FIG. 2A depicts an example of a document, in accordance with some example embodiments.
Figure 2B:
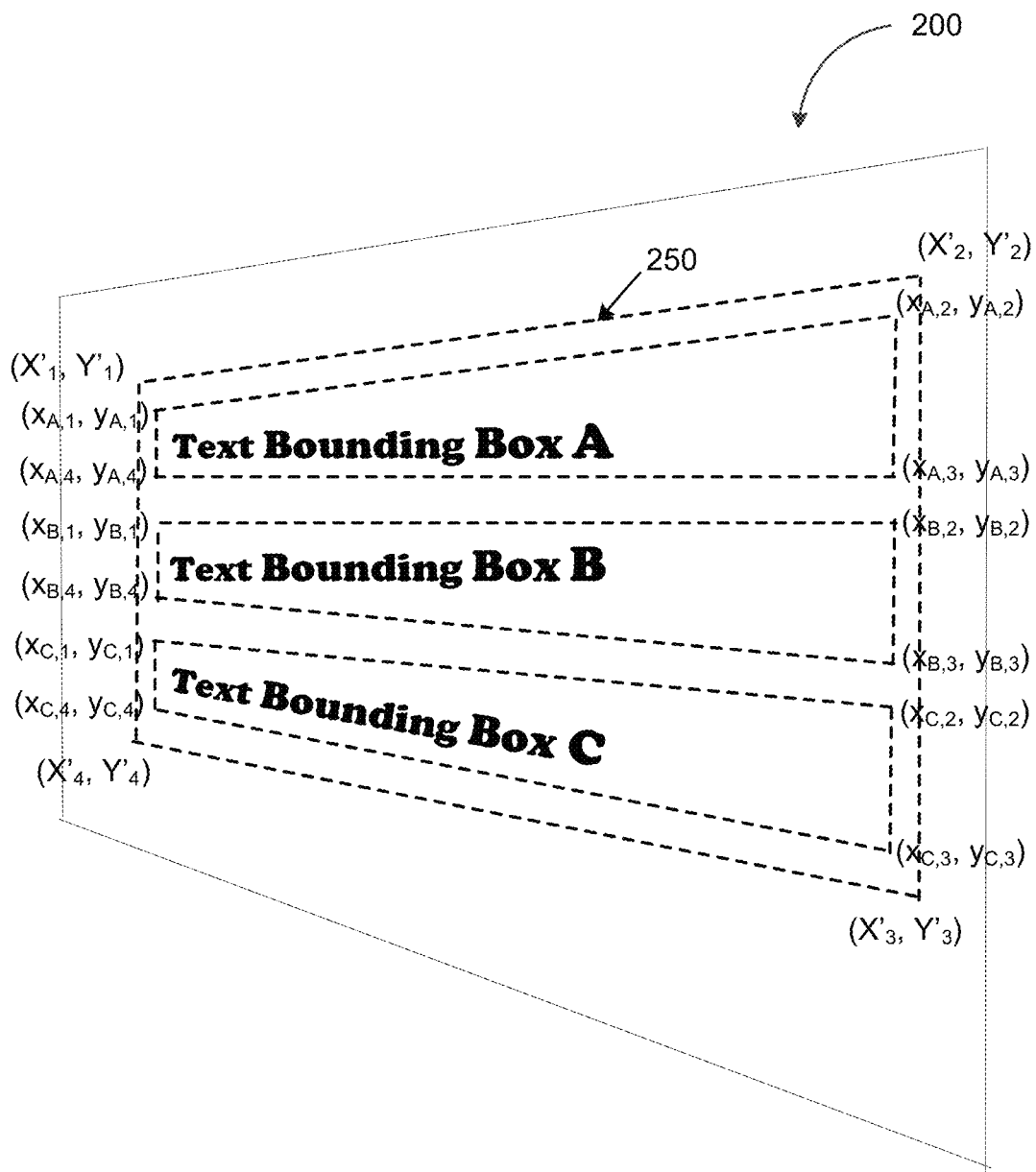
FIG. 2B depicts an example of a skewed document, in accordance with some example embodiments.

To further illustrate, FIG. 2A depicts an example of the image 135 in which a document 200 is captured without any visual aberrations while FIG. 2B depicts another example of the image 135 in which the document 200 is captured with a perspective distortion. Referring to FIGS. 2A-B, the document 200 may be processed, for example, by the optical character recognition engine 115, to identify one or more text bounding boxes that enclose one or more corresponding lines of text present in the document 200. For example, in the examples shown in FIGS. 2A-B, the optical character recognition engine 115 may identify text bounding box A defined by the coordinates $\{(x_{A,1}, y_{A,1}), (x_{A,2}, y_{A,2}), (x_{A,3}, y_{A,3}), (x_{A,4}, y_{A,4})\}$, text bounding box B defined by the coordinates $\{(x_{B,1}, y_{B,1}), (x_{B,2}, y_{B,2}), (x_{B,3}, y_{B,3}), (x_{B,4}, y_{B,4})\}$, and text bounding box C defined by the coordinates $\{(x_{C,1}, y_{C,1}), (x_{C,2}, y_{C,2}), (x_{C,3}, y_{C,3}), (x_{C,4}, y_{C,4})\}$.

In some example embodiments, the deskewing controller 110 may apply the machine learning model 113 to determine, based at least on the coordinates of the one or more text bounding boxes present in the document 200, the coordinates of a document bounding box 250. The machine learning model 113 may include one or more of a multilayer perceptron, a transformer, a recurrent neural network (e.g., a long short term memory (LSTM) network), a linear regression model, a support vector machine, a random forest, a Gaussian process, and/or the like. For example, in the example shown in FIG. 2A, the machine learning model 113 may be trained to infer, based at least on the coordinates of text bounding box A $\{(x_{A,1}, y_{A,1}), (x_{A,2}, y_{A,2}), (x_{A,3}, y_{A,3}), (x_{A,4}, y_{A,4})\}$, the coordinates of text bounding box B $\{(x_{B,1}, y_{B,1}), (x_{B,2}, y_{B,2}), (x_{B,3}, y_{B,3}), (x_{B,4}, y_{B,4})\}$, and the coordinates of text bounding box C $\{(x_{C,1}, y_{C,1}), (x_{C,2}, y_{C,2}), (x_{C,3}, y_{C,3}), (x_{C,4}, y_{C,4})\}$, the coordinates $\{(X_1, Y_1), (X_2, Y_2), (X_3, Y_3), (X_4, Y_4)\}$ defining the document bounding box 250.

Referring to FIG. 2B, which shows an example of the image 135 in which the document 200 is depicted with a perspective distortion, the machine learning model 113 may be applied to determine the coordinates $\{(X'_1, Y'_1), (X'_2, Y'_2), (X'_3, Y'_3), (X'_4, Y'_4)\}$ defining the document bounding box 250. In this case, the document bounding box 250 may encapsulate the perspective distortion present in the image 135 of the document 200. Accordingly, the deskewing controller 110 may determine, based at least on the coordinates $\{(X'_1, Y'_1), (X'_2, Y'_2), (X'_3, Y'_3), (X'_4, Y'_4)\}$ defining the document bounding box 250, one or more transformations to deskew the image 135 of the document 200 and correct the one or more visual aberrations present in the image 135 of the document 200, such as the perspective distortion shown in FIG. 2B. One or more downstream tasks, such as those associated with the application 125 at the processing engine 120, may be performed based on the deskewed image 135 of the document 200. Performing the downstream tasks on the deskewed image 135 of the document 200 may increase the accuracy and computational efficiency of these downstream tasks.

FIGS. 4A-F depict additional examples of the image 135 of the document 200 and a version of the image 135 of the document 200 that is deskewed by applying the one or more transformations determined based on the document bounding box 250 determined by the machine learning model 113. The performance of the deskewing performed by applying the one or more transformations may be evaluated based on the metric determined in accordance with Equation (1) below. According to Equation (1), the performance of the deskewing engine 110 may be evaluated based at least on the average angle of transformed document bounding boxes, which result from applying the one or more transformations to the document bounding boxes present in the skewed image of the document. In Equation (1), the angle of the transformed document bounding boxes are expressed in radians and fall in the range $[-\pi/2, \pi/2]$.

$$\text{metric} = 100 - 400/\pi * \text{average\_absolute\_value\_of\_angle} \quad (1)$$

The foregoing metric was applied to evaluate the performance of the deskewing engine 110 in correcting a variety of visual aberrations including those that can be corrected by applying one or more transformations (e.g., rotations, perspective distortions, optical distortions, and/or the like) and those that cannot be corrected by applying a transformation (e.g., crumbling). While the raw images are associated with a score of 87.4% and merely de-rotating the raw images achieved a score of 93.3%, images that are deskewed by applying the one or more transformations score determined based on the document bounding box 250 determined by the machine learning model 113 achieved a score of 94.4%.

In the event the document 200 contains an M quantity of text bounding boxes, the deskewing controller 110 may be configured to apply the machine learning model 113 to an N quantity of text bounding boxes that represents a minimum quantity and/or a maximum quantity of text bounding boxes used to infer the coordinates of the document bounding box 250. In some cases where the document 200 includes a large number of text bounding boxes (e.g., M>>N), the deskewing controller 110 may select the N quantity of text bounding boxes to include some but not all of the M quantity of text bounding boxes present in the document 200. For example, the M quantity of text bounding boxes may include a first text bounding box from the top of the document 200, a second text bounding box from the bottom of the document 200, and a third text bounding box between the first text bounding box and the second text bounding box. Alternatively, in cases where the document 200 includes a small number of text bounding boxes (e.g., M<<N), the deskewing controller 110 may duplicate one or more of the text bounding boxes present in the document 200 in order to generate the N quantity of text bounding boxes for processing by the machine learning model 113.

In some example embodiments, an individual training sample of the training data used to train the machine learning model 113 may be generated by applying one or more distortions to an image of a document without any visual aberrations. To further illustrate, referring to FIGS. 2A-B, a perspective distortion may be applied to the image 135 of the document 200 shown in FIG. 2A to generate a training sample that corresponds to the image 135 of the document 200 shown in FIG. 2B in which the document 200 is shown with the perspective distortion. For example, to generate a training sample, the document bounding box 250 in FIG. 2A may be determined by defining a minimum rectangle that encloses text bounding box A, text bounding box B, and text bounding box C. Although shown with some margins in FIG. 2A, in practice, the document bounding box 250 may be defined to overlap the edges text bounding box A, text bounding box B, and text bounding box C with no or minimal margins. Thereafter, four points may be selected to define the corners of the distorted document bounding box 250. For instance, to avoid excess distortions, these four points may be selected to be no more than a threshold percentage (e.g., 20% or the like) of the width or height of the document 200 away from the corners of the document 200. The transformation necessary to transform the document bounding box 250 into the distorted document bounding box 250 having those four points as its vertices may be determined and applied to text bounding box A, text bounding box B, and text bounding box C to generate the distorted text bounding boxes shown in FIG. 2B. The resulting training sample therefore includes the distorted text bounding boxes shown in FIG. 2B and a ground truth label including the distorted document bounding box 250.

The resulting training sample may therefore include the coordinates of the N quantity of the text bounding boxes present in the distorted document 200. Moreover, the training sample may be associated with a ground truth label corresponding to coordinates of the document bounding box 250 associated with the distorted document 200. Accordingly, the training of the machine learning model 113 may include applying the machine learning model 113 to the training sample including the N quantity of the text bounding boxes present in the distorted document 200. Moreover, the training of the machine learning model 113 may include adjusting the weights applied by the machine learning model 113 to minimize a difference between the coordinates of the document bounding box 250 output by the machine learning model 113 for the training sample and the corresponding coordinates of the ground truth label.

Figure 3A:
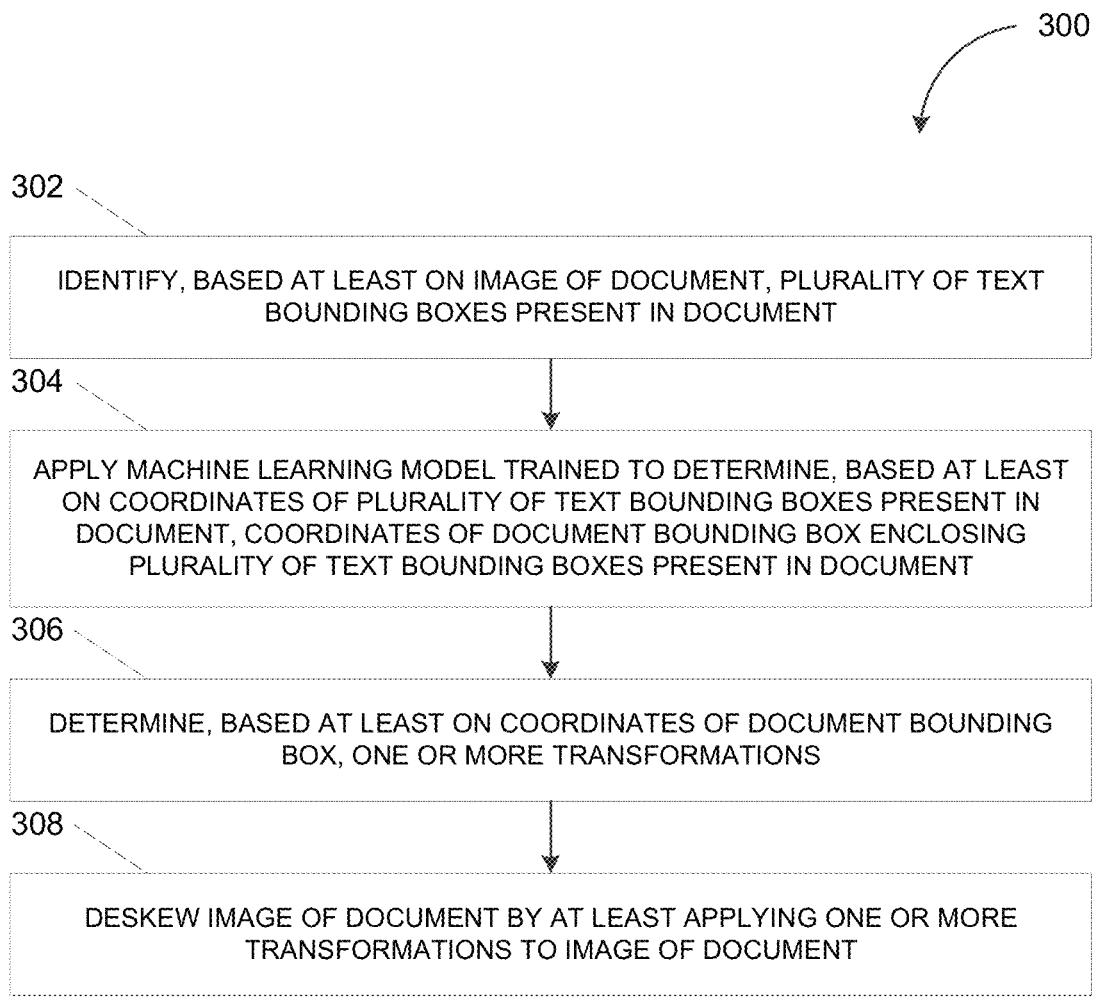
FIG. 3A depicts a flowchart illustrating an example of a process for machine learning enabled deskewing of a document, in accordance with some example embodiments.

FIG. 3A depicts a flowchart illustrating an example of a process 300 for machine learning enabled deskewing of a document, in accordance with some example embodiments. Referring to FIG. 3A, the process 300 may be performed by the deskewing controller 110 to deskew a document exhibiting one or more visual aberrations such as rotations, radial distortions, perspective distortions, and/or the like.

At 302, the deskewing controller 110 may identify, based at least on an image of a document, a plurality of text bounding boxes present in the document. For example, as shown in FIGS. 2A-B, the deskewing controller 110 may determine, based at least on the image 135 of the document 200, text bounding box A defined by the coordinates $\{(x_{A,1},y_{A,1}), (x_{A,2},y_{A,2}), (x_{A,3},y_{A,3}), (x_{A,4},y_{A,4})\}$, text bounding box B defined by the coordinates $\{(x_{B,1},y_{B,1}), (x_{B,2},y_{B,2}), (x_{B,3},y_{B,3}), (x_{B,4},y_{B,4})\}$, and text bounding box C defined by the coordinates $\{(x_{C,1},y_{C,1}), (x_{C,2},y_{C,2}), (x_{C,3},y_{C,3}), (x_{C,4},y_{C,4})\}$. Each of text bounding box may enclose at least a portion of the content present in the image 135 of the document 200 such as, for example, a line of text included in the image 135 of the document 200.

At 304, the deskewing controller 110 may apply a machine learning model trained to determine, based at least on the coordinates of the plurality of text bounding boxes present in the document, the coordinates of a document bounding box enclosing the plurality of text bounding boxes present in the document. For example, the deskewing controller 110 may apply the machine learning model 113 to determine, based at least on the coordinates of the text bounding box A, the text bounding box B, and text bounding box C, the coordinates $\{(X_1,Y_1), (X_2,Y_2), (X_3,Y_3), (X_4,Y_4)\}$ of the document bounding box 250. In some example embodiments, the deskewing controller 110 may apply the machine learning model 113 to a threshold quantity of text bounding boxes present in the image 135 of the document 200. For example, where the document 200 contains an M quantity of text bounding boxes, the deskewing controller 110 may apply the machine learning model 113 to an N quantity of text bounding boxes that represents a minimum quantity and/or a maximum quantity of text bounding boxes used to infer the coordinates of the document bounding box 250.

At 306, the deskewing controller 110 may determine, based at least on the coordinates of the document bounding box, one or more transformations. In some example embodiments, the deskewing controller 110 may determine, based at least on the coordinates $\{(X_1,Y_1), (X_2,Y_2), (X_3,Y_3), (X_4,Y_4)\}$ defining the document bounding box 250, one or more transformations to correct the one or more visual aberrations present in the image 135 of the document 200. For example, where the image 135 of the document 200 includes the perspective distortion shown in FIG. 2B, the deskewing controller 110 may determine, based at least on the coordinates of the document bounding box 250, a perspective transformation to correct the perspective distortion present in the image 135 of the document 200.

At 308, the deskewing controller 110 may deskew the image of the document by at least applying, to the image of the document, the one or more transformations. For example, the deskewing controller 110 may apply a perspective transformation to correct the perspective distortion present in the example of the image 135 of the document 200 shown in FIG. 2B. Deskewing the image 135 of the document 200 may improve the accuracy and computational efficiency of one or more downstream tasks. Deskewing the image 135 of the document 200 may improve the accuracy and computational efficiency of one or more downstream tasks performed on the image 135 of the document 200 such as, for example, optical character recognition (OCR), document classification, information extraction, and/or the like.

Figure 3B:
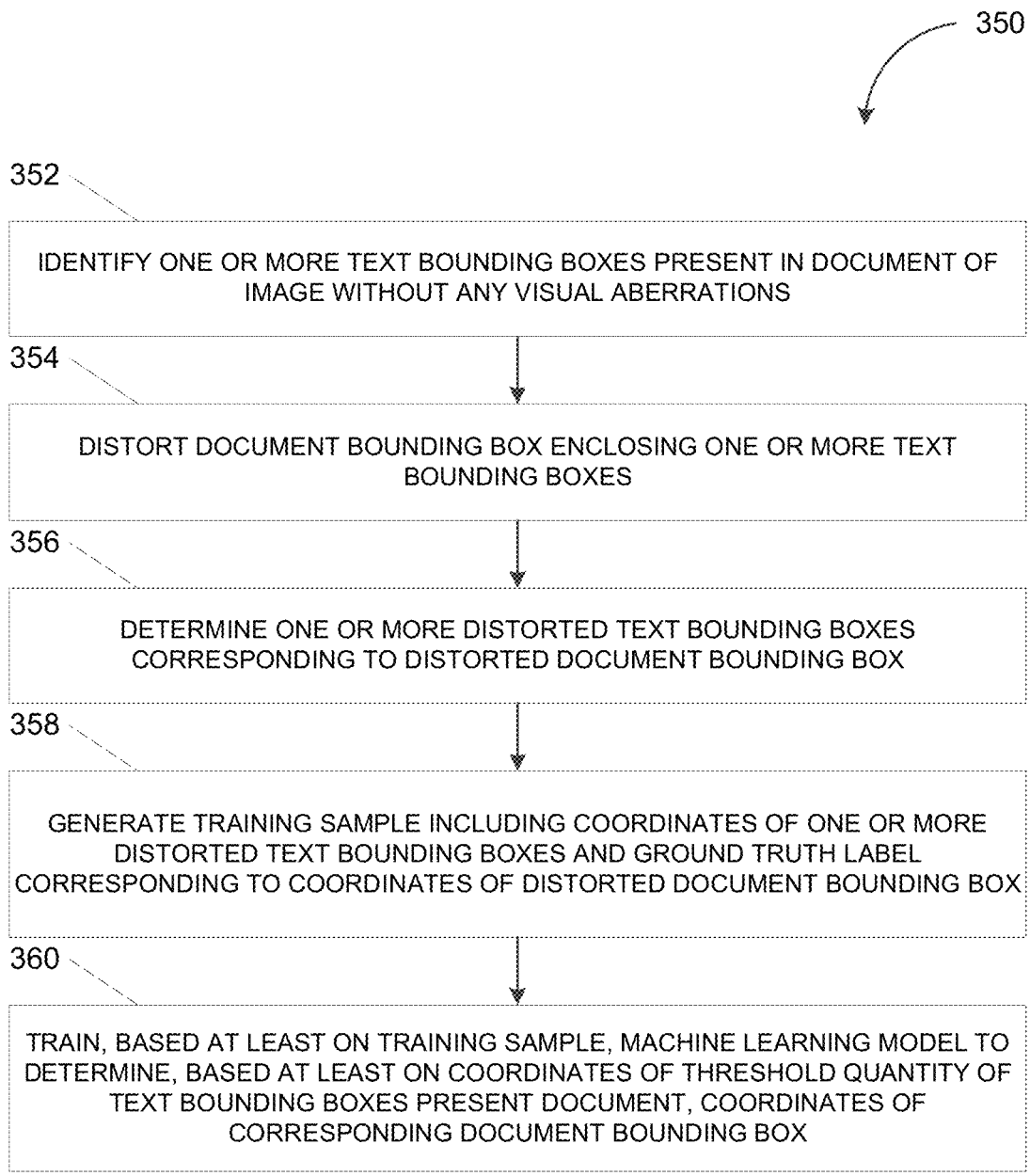
FIG. 3B depicts a flowchart illustrating an example of a process for training a machine learning model to identify a document bounding box, in accordance with some example embodiments.
Figure 4A:
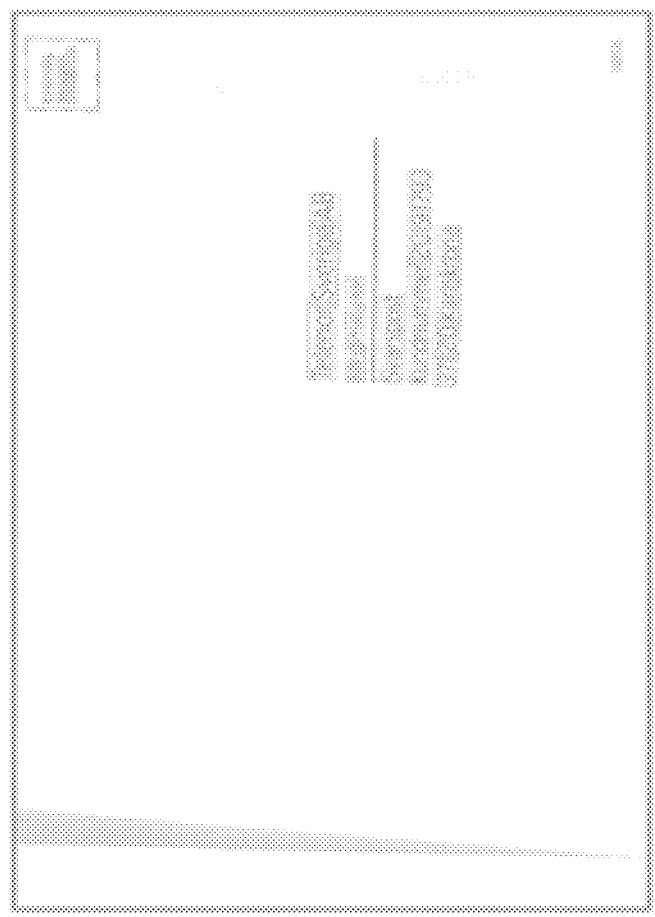
FIG. 4A depicts an example of an image of a document and a deskewed version of the image of the document, in accordance with some example embodiments.
Figure 4A:
Figure 4B:
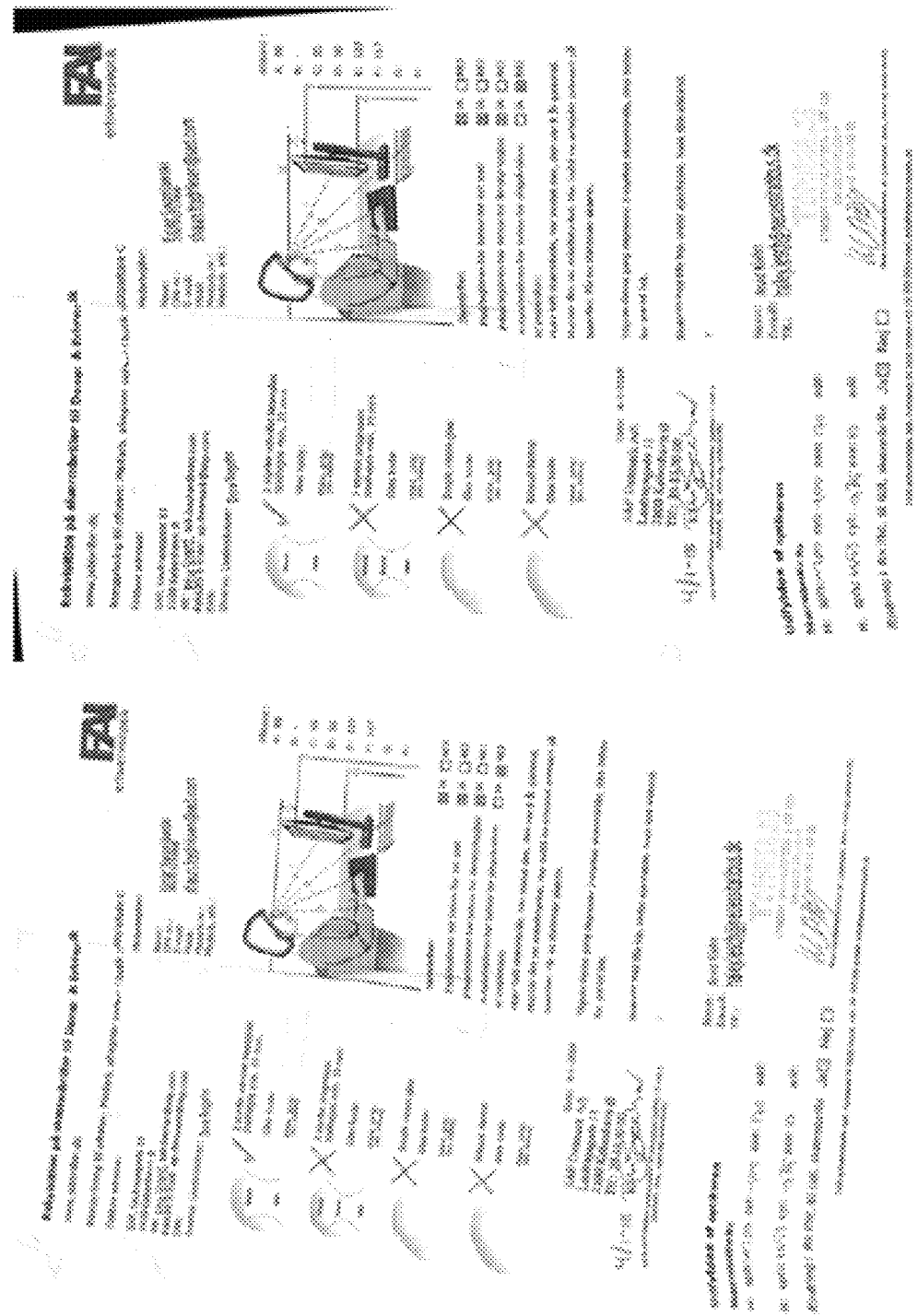
FIG. 4B depicts another example of an image of a document and a deskewed version of the image of the document, in accordance with some example embodiments.
Figure 4C:
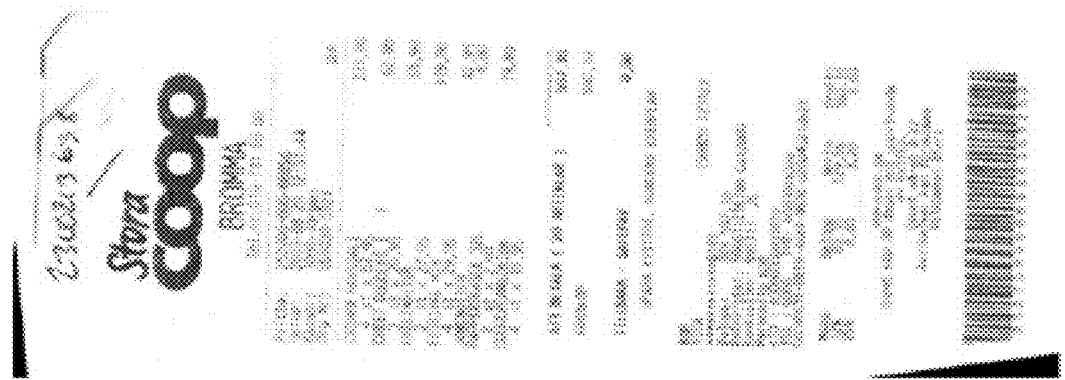
FIG. 4C depicts another example of an image of a document and a deskewed version of the image of the document, in accordance with some example embodiments.
Figure 4C:
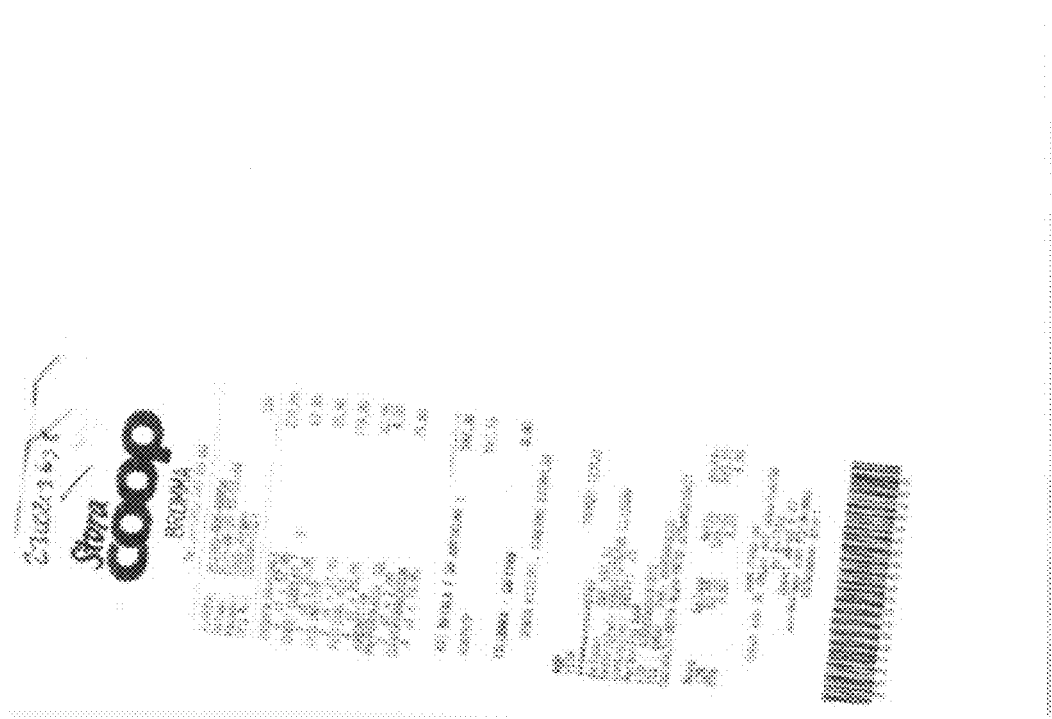
Figure 4D:
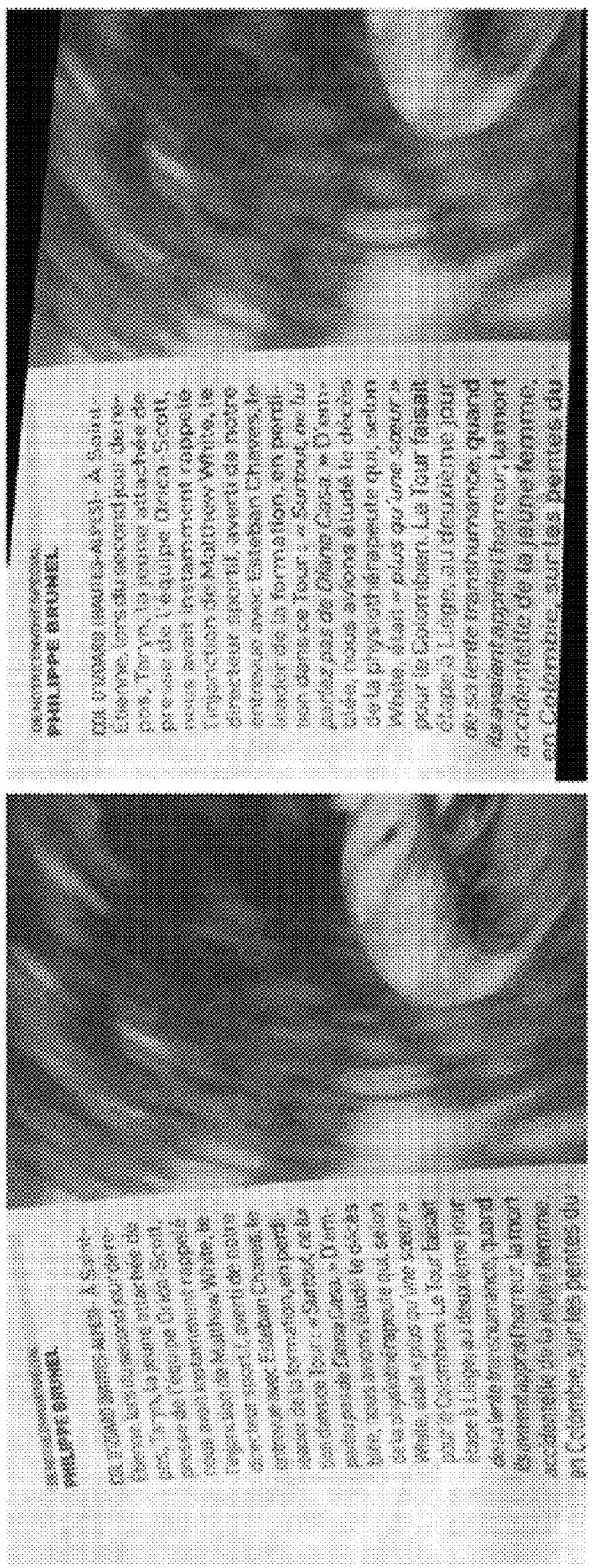
FIG. 4D depicts another example of an image of a document and a deskewed version of the image of the document, in accordance with some example embodiments.
Figure 4E:
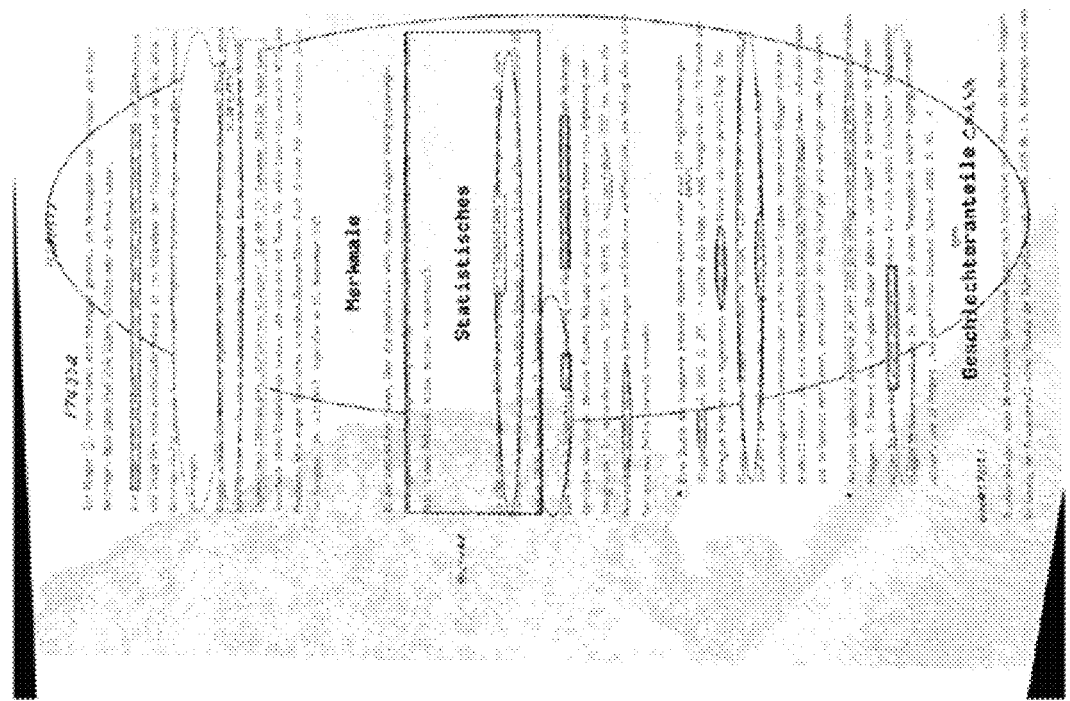
FIG. 4E depicts another example of an image of a document and a deskewed version of the image of the document, in accordance with some example embodiments.
Figure 4E:
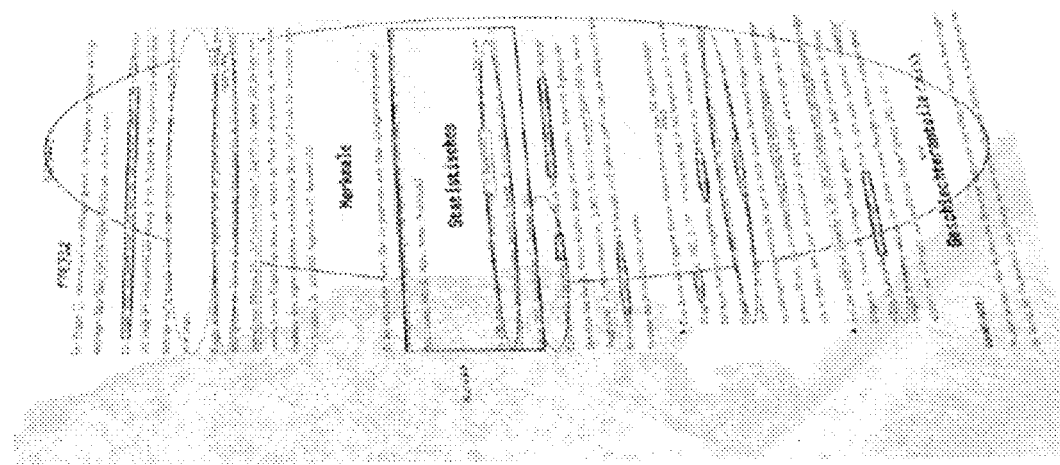

FIG. 3B depicts a flowchart illustrating an example of a process 350 for training a machine learning model to identify a document bounding box, in accordance with some example embodiments. In some example embodiments, the process 350 may be performed by the deskewing controller 110 to train the machine learning model 113 to determine, based on a threshold quantity of text bounding boxes present in an image of a document, a document bounding box that encapsulates one or more visual aberrations present in the image of the document.

At 352, the deskewing controller 110 may identify one or more text bounding boxes present in an image of a document without any visual aberrations. For example, the deskewing controller 110 may identify, within the image 135 of the document 200, text bounding box A defined by the coordinates $\{(x_{A,1},y_{A,1}), (x_{A,2},y_{A,2}), (x_{A,3},y_{A,3}), (x_{A,4},y_{A,4})\}$, text bounding box B defined by the coordinates $\{(x_{B,1},y_{B,1}), (x_{B,2},y_{B,2}), (x_{B,3},y_{B,3}), (x_{B,4},y_{B,4})\}$, and text bounding box C defined by the coordinates $\{(x_{C,1},y_{C,1}), (x_{C,2},y_{C,2}), (x_{C,3},y_{C,3}), (x_{C,4},y_{C,4})\}$.

At 354, the deskewing controller 110 may distort a document bounding box enclosing the one or more text bounding boxes. For example, the deskewing controller 110 may determine the document bounding box 250 by at least identifying a minimal rectangle enclosing bounding box A, text bounding box B, and text bounding box C. Being a minimal rectangle, the document bounding box 250 may therefore overlap edges text bounding box A, text bounding box B, and text bounding box C with no or minimal margins. Moreover, the deskewing controller 110 may distort the document bounding box 250 may selecting four points that define the corners of the distorted document bounding box 250. As noted, to avoid excess distortions, the deskewing controller 110 may select four points that are no more than a threshold percentage (e.g., 20% or the like) of the width or height of the document 200 away from the corners of the document 200.

At 356, the deskewing controller 110 may determine one or more distorted text bounding boxes corresponding to the distorted document bounding box. For example, the deskewing controller 110 may determine the transformation necessary to transform the document bounding box 250 into the distorted document bounding box 250. Moreover, the deskewing controller 110 may apply the same transformation to text bounding box A, text bounding box B, and text bounding box C, thereby generating distorted versions of text bounding box A, text bounding box B, and text bounding box C that correspond to the distorted document bounding box 250.

At 358, the deskewing controller 110 may generate a training sample including the coordinates of the one or more distorted text bounding boxes and a ground truth label corresponding to the coordinates of the distorted document bounding box. For example, the deskewing controller 110 may generate a training sample that includes the coordinates of the distorted text bounding box A, text bounding box B, and text bounding box C. Moreover, the deskewing controller 110 may generate the training sample to include a ground truth label corresponding to the coordinates of the document bounding box 250.

At 360, the deskewing controller 110 may train, based at least on the training sample, a machine learning model to determine, based at least on the coordinates of a threshold quantity of text bounding boxes present in a document, the coordinates of a corresponding document bounding box. For example, the deskewing controller 110 may train, based at least on the training sample, the machine learning model 113. The training of the machine learning model 113 may include adjusting the weights applied by the machine learning model 113 to minimize a difference between the coordinates of the document bounding box 250 output by the machine learning model 113 for the training sample and the coordinates of the document bounding box 250 associated with the ground truth label.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: determining, based at least on a first image of a first document, a plurality of text bounding boxes present in the first document; applying a machine learning model trained to determine, based at least on a first plurality of coordinates defining the plurality of text bounding box present in the first document, a second plurality of coordinates of a first document bounding box enclosing the one or more text bounding boxes present in the first document; determining, based at least on the second plurality of coordinates of the first document bounding box, one or more transformations; and deskewing the first image of the first document by at least applying, to the first image of the first document, the one or more transformations.

Example 2: The system of Example 1, wherein the machine learning model is applied to a threshold quantity of text bounding boxes present in the first document.

Example 3: The system of Example 2, wherein the threshold quantity of text bounding boxes include a first text bounding box from a top of the first document, a second text bounding box from a bottom of the first document, and a third text bounding box between the first text bounding box and the second text bounding box.

Example 4: The system of any one of Examples 2 to 3, wherein the operations further include: in response to the first document including less than the threshold quantity of text bounding boxes, duplicating at least one of the plurality of text bounding boxes present in the first document to generate the threshold quantity of text bounding boxes.

Example 5: The system of any one of Examples 2 to 4, wherein the operations further include: in response to the first document including more than the threshold quantity of text bounding boxes, selecting some but not all of the plurality of text bounding boxes present in the first document to generate the threshold quantity of text bounding boxes.

Example 6: The system of any one of Examples 1 to 5, wherein the operations further include: generating, based at least on a second image of a second document without any visual aberrations, a training sample; and training, based at least on the training sample, the machine learning model.

Example 7: The system of Example 6, wherein the training sample is generated by at least identifying one or more text bounding boxes present in the second document, determining a second document bounding box enclosing the one or more text bounding boxes, distorting the second document bounding box, and determining one or more distorted text bounding boxes corresponding to the distorted second document bounding box.

Example 8: The system of Example 7, wherein the training sample is generated to include a third plurality of coordinates of the one or more distorted text bounding boxes and a ground truth label corresponding to a fourth plurality of coordinates of the distorted second document bounding box.

Example 9: The system of any one of Example 1 to 8, wherein the operations further include: performing, based at least on the deskewed first image of the first document, one or more downstream tasks on the first document.

Example 10: The system of Example 9, wherein the one or more downstream tasks include optical character recognition (OCR), document classification, and/or information extraction.

Example 11: The system of any one of Examples 1 to 10, wherein the plurality of text bounding boxes are identified by performing optical character recognition (OCR) on the first document to identify a plurality of lines of text present in the first document, and wherein each text bounding box of the plurality of text bounding boxes encloses a corresponding line of text of the plurality of lines of text.

Example 12: The system of any one of Examples 1 to 11, wherein the first plurality of coordinates include an x-coordinate and a y-coordinate for each corner of the plurality of text bounding boxes.

Example 13: The system of any one of Examples 1 to 12, wherein the second plurality of coordinates include an x-coordinate and a y-coordinate for each corner of the first document bounding box.

Example 14: The system of any one of Examples 1 to 13, wherein the machine learning model comprises one or more of a multilayer perceptron, a transformer, a recurrent neural network, a linear regression model, a support vector machine, a random forest, or a Gaussian process.

Example 15: The system of any one of Examples 1 to 14, wherein the one or more transformations are applied to correct at least one visual aberration present in the first image of the first document, and wherein the at least one visual aberration includes a rotation, a perspective distortion, and/or an optical distortion.

Example 16: A computer-implemented method, comprising: determining, based at least on a first image of a first document, a plurality of text bounding boxes present in the first document; applying a machine learning model trained to determine, based at least on a first plurality of coordinates defining the plurality of text bounding box present in the first document, a second plurality of coordinates of a first document bounding box enclosing the one or more text bounding boxes present in the first document; determining, based at least on the second plurality of coordinates of the first document bounding box, one or more transformations; and deskewing the first image of the first document by at least applying, to the first image of the first document, the one or more transformations.

Example 17: The method of Example 16, wherein the machine learning model is applied to a threshold quantity of text bounding boxes present in the first document, wherein the threshold quantity of text bounding boxes include a first text bounding box from a top of the first document, a second text bounding box from a bottom of the first document, and a third text bounding box between the first text bounding box and the second text bounding box, wherein in response to the first document including less than the threshold quantity of text bounding boxes, at least one of the plurality of text bounding boxes present in the first document is duplicated to generate the threshold quantity of text bounding boxes, and wherein in response to the first document including more than the threshold quantity of text bounding boxes, some but not all of the plurality of text bounding boxes present in the first document are selected to generate the threshold quantity of text bounding boxes.

Example 18: The method of any one of Examples 16 to 17, further comprising: generating, based at least on a second image of a second document without any visual aberrations, a training sample, the training sample being generated by at least identifying one or more text bounding boxes present in the second document, determining a second document bounding box enclosing the one or more text bounding boxes, distorting the second document bounding box, and determining one or more distorted text bounding boxes corresponding to the distorted second document bounding box, the training sample being generated to include a third plurality of coordinates of the one or more distorted text bounding boxes and a ground truth label corresponding to a fourth plurality of coordinates of the distorted second document bounding box; and training, based at least on the training sample, the machine learning model.

Example 19: The method of any one of Examples 16 to 18, further comprising: performing, based at least on the deskewed first image of the first document, one or more downstream tasks on the first document, the one or more downstream tasks including optical character recognition (OCR), document classification, and/or information extraction.

Example 20: A non-transitory computer readable medium storing instructions, which when executed by at least one data processor, result in operations comprising: determining, based at least on a first image of a first document, a plurality of text bounding boxes present in the first document; applying a machine learning model trained to determine, based at least on a first plurality of coordinates defining the plurality of text bounding box present in the first document, a second plurality of coordinates of a first document bounding box enclosing the one or more text bounding boxes present in the first document; determining, based at least on the second plurality of coordinates of the first document bounding box, one or more transformations; and deskewing the first image of the first document by at least applying, to the first image of the first document, the one or more transformations.

Figure 5:
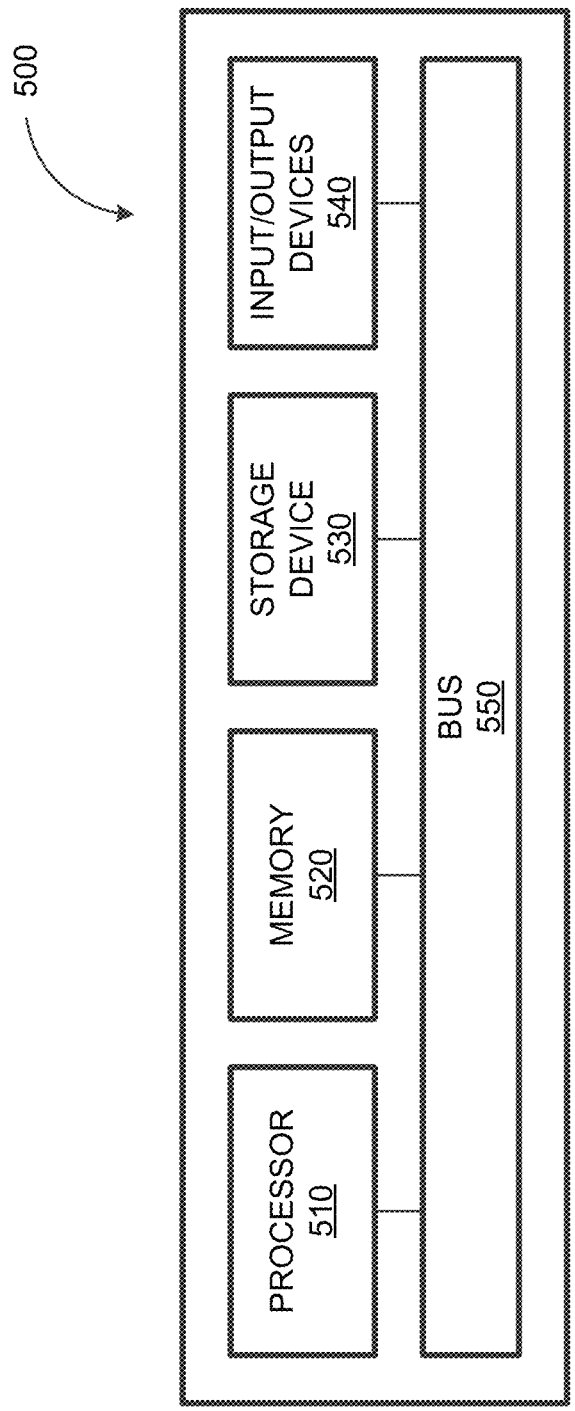
FIG. 5 depicts a block diagram illustrating an example of a computing system, in accordance with some example embodiments.

FIG. 5 depicts a block diagram illustrating a computing system 500, in accordance with some example embodiments. Referring to FIGS. 1-5, the computing system 500 can be used to implement the deskewing controller 110, the processing engine 120, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the deskewing controller 110 and the processing engine 120. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions which, when executed by the at least one data processor, result in operations comprising:
   determining, based at least on a first image of a first document, a plurality of text bounding boxes present in the first document;
   applying a machine learning model trained to determine, based at least on a first plurality of coordinates defining the plurality of text bounding box present in the first document, a second plurality of coordinates of a first document bounding box enclosing one or more text bounding boxes present in the first document, wherein the machine learning model is applied to a threshold quantity of text bounding boxes present in the first document, wherein in response to the first document including less than the threshold quantity of text bounding boxes, duplicating at least one of the plurality of text bounding boxes present in the first document to generate the threshold quantity of text bounding boxes;

determining, based at least on the second plurality of coordinates of the first document bounding box, one or more transformations; and deskewing the first image of the first document by at least applying, to the first image of the first document, the one or more transformations.

2. The system of claim 1, wherein the threshold quantity of text bounding boxes include a first text bounding box from a top of the first document, a second text bounding box from a bottom of the first document, and a third text bounding box between the first text bounding box and the second text bounding box.

3. The system of claim 1, wherein the operations further include:

in response to the first document including more than the threshold quantity of text bounding boxes, selecting some of the plurality of text bounding boxes present in the first document to generate the threshold quantity of text bounding boxes.

4. The system of claim 1, wherein the operations further include:

generating, based at least on a second image of a second document without any visual aberrations, a training sample; and training, based at least on the training sample, the machine learning model.

5. The system of claim 4, wherein the training sample is generated by at least identifying one or more text bounding boxes present in the second document, determining a second document bounding box enclosing the one or more text bounding boxes, distorting the second document bounding box, and determining one or more distorted text bounding boxes corresponding to the distorted second document bounding box.

6. The system of claim 5, wherein the training sample is generated to include a third plurality of coordinates of the one or more distorted text bounding boxes and a ground truth label corresponding to a fourth plurality of coordinates of the distorted second document bounding box.

7. The system of claim 1, wherein the operations further include:

performing, based at least on the deskewed first image of the first document, one or more downstream tasks on the first document.

8. The system of claim 7, wherein the one or more downstream tasks include optical character recognition (OCR), document classification, and/or information extraction.

9. The system of claim 1, wherein the plurality of text bounding boxes are identified by performing optical character recognition (OCR) on the first document to identify a plurality of lines of text present in the first document, and wherein each text bounding box of the plurality of text bounding boxes encloses a corresponding line of text of the plurality of lines of text.

10. The system of claim 1, wherein the first plurality of coordinates include an x-coordinate and a y-coordinate for each corner of the plurality of text bounding boxes.

11. The system of claim 1, wherein the second plurality of coordinates include an x-coordinate and a y-coordinate for each corner of the first document bounding box.

12. The system of claim 1, wherein the machine learning model comprises one or more of a multilayer perceptron, a transformer, a recurrent neural network, a linear regression model, a support vector machine, a random forest, or a Gaussian process.

13. The system of claim 1, wherein the one or more transformations are applied to correct at least one visual aberration present in the first image of the first document, and wherein the at least one visual aberration includes a rotation, a perspective distortion, and/or an optical distortion.

14. A computer-implemented method, comprising:

determining, based at least on a first image of a first document, a plurality of text bounding boxes present in the first document;

applying a machine learning model trained to determine, based at least on a first plurality of coordinates defining the plurality of text bounding box present in the first document, a second plurality of coordinates of a first document bounding box enclosing one or more text bounding boxes present in the first document, wherein the machine learning model is applied to a threshold quantity of text bounding boxes present in the first document, wherein in response to the first document including less than the threshold quantity of text bounding boxes, duplicating at least one of the plurality of text bounding boxes present in the first document to generate the threshold quantity of text bounding boxes;

determining, based at least on the second plurality of coordinates of the first document bounding box, one or more transformations; and deskewing the first image of the first document by at least applying, to the first image of the first document, the one or more transformations.

15. The method of claim 14, wherein the threshold quantity of text bounding boxes include a first text bounding box from a top of the first document, a second text bounding box from a bottom of the first document, and a third text bounding box between the first text bounding box and the second text bounding box, and wherein in response to the first document including more than the threshold quantity of text bounding boxes, some of the plurality of text bounding boxes present in the first document are selected to generate the threshold quantity of text bounding boxes.

16. The method of claim 14, further comprising:

generating, based at least on a second image of a second document without any visual aberrations, a training sample, the training sample being generated by at least identifying one or more text bounding boxes present in the second document, determining a second document bounding box enclosing the one or more text bounding boxes, distorting the second document bounding box, and determining one or more distorted text bounding boxes corresponding to the distorted second document bounding box, the training sample being generated to include a third plurality of coordinates of the one or more distorted text bounding boxes and a ground truth label corresponding to a fourth plurality of coordinates of the distorted second document bounding box; and training, based at least on the training sample, the machine learning model.

17. The method of claim 14, further comprising:

performing, based at least on the deskewed first image of the first document, one or more downstream tasks on the first document, the one or more downstream tasks including optical character recognition (OCR), document classification, and/or information extraction.

18. A non-transitory computer readable medium storing instructions, which when executed by at least one data processor, result in operations comprising:
  determining, based at least on a first image of a first document, a plurality of text bounding boxes present in the first document;
  applying a machine learning model trained to determine, based at least on a first plurality of coordinates defining the plurality of text bounding box present in the first document, a second plurality of coordinates of a first document bounding box enclosing one or more text bounding boxes present in the first document, wherein the machine learning model is applied to a threshold quantity of text bounding boxes present in the first document, wherein in response to the first document including less than the threshold quantity of text bounding boxes, duplicating at least one of the plurality of text bounding boxes present in the first document to generate the threshold quantity of text bounding boxes;
  determining, based at least on the second plurality of coordinates of the first document bounding box, one or more transformations; and
  deskewing the first image of the first document by at least applying, to the first image of the first document, the one or more transformations.

* * * * *